United States Patent Office 3,445,469
Patented May 20, 1969

3,445,469
α-MONOGLYCERIDE OF 4-(2'-CARBOXYPHENYL-
AMINO)-8-CHLORO-QUINOLINE
Andre Allais, Les Lilas, and Pierre Girault, Paris,
France, assignors to Roussel-UCLAF, Paris, France,
a corporation of France
No Drawing. Filed Feb. 1, 1966, Ser. No. 523,848
The portion of the term of the patent subsequent
to Feb. 1, 1983, has been disclaimed
Int. Cl. C07d 33/48; A61k 27/00
U.S. Cl. 260—287                                    3 Claims

ABSTRACT OF THE DISCLOSURE

The α-monoglyceride of 4-(2'-carboxyphenylamino)-8-chloro quinoline having the formula

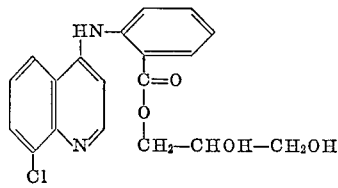

and its non-toxic, pharmaceutically acceptable acid addition salts. The compounds are anti-inflammatory and analgesic agents.

PRIOR ART

In commonly assigned U.S. Patent No. 3,174,972, there are described quinoline derivatives such as 4-(2'-carbomethoxyphenylamino)-7-chloro-quinoline and 4-(2'-carbobutoxyphenylamino)-7-chloro-quinoline which possess an anti-inflammatory and analgesic activity. However, the α-monoglyceride of 4-(2'-carboxyphenylamino)-8-chloro-quinoline of the present invention possesses a remarkable anti-inflammatory and a more intense and more regular analgesic activity.

OBJECTS OF THE INVENTION

It is an object of the invention to provide the novel product, the α-monoglyceride of 4-(2'-carboxyphenyl-amino)-8-chloro-quinoline and its acid addition salts.

It is another object of the invention to provide a novel process for the preparation of the α-monoglyceride of 4-(2'-carboxyphenylamino)-8-chloro-quinoline.

It is a further object of the invention to provide novel intermediates for the α-monoglyceride of 4-(2'-carboxy-phenylamino)-8-chloro-quinoline.

It is another object of the invention to provide novel anti-inflammatory and analgesic composition.

It is another object of the invention to provide a novel method of relieving pain and inflammatory manifestations.

These and other objects and advantages of the invention will become obvious from the following detailed description.

THE INVENTION

The novel quinoline derivatives of the invention are selected from the group consisting of the α-monoglyceride of 4-(2'-carboxyphenylamino)-8-chloro-quinoline having the formula

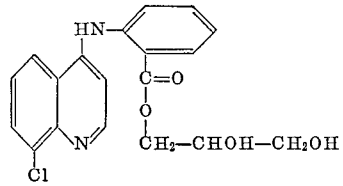

and its non-toxic, pharmacologically acceptable acid addition salts. Examples of suitable acids for the acid addition salts are organic acids such as citric acid, tartaric acid, acetic acid, etc. and inorganic acids such as hydrochloric acid, etc.

The process of the invention for the preparation of the α-monoglyceride of 4-(2'-carboxyphenylamino)-8-chloro-quinoline comprises reacting 4,8-dichloro-quinoline with a lower alkyl anthranilate to form a 4-(2'-carbo lower alkoxyphenylamino)-8-chloro-quinoline, subjecting the latter to a transesterification with glycerol acetonide in the presence of an alkaline agent such as sodium or sodium amide to form the acetonide of the α-monoglyceride of 4-(2'-carboxyphenylamino)-8-chloro-quinoline and hydrolyzing the latter under acid conditions to form the corresponding acid salt of the α-monoglyceride of 4-(2'-carboxyphenylamino)-8-chloro-quinoline which can be converted to the free base. The reaction scheme is illustrated in Table I.

Table I

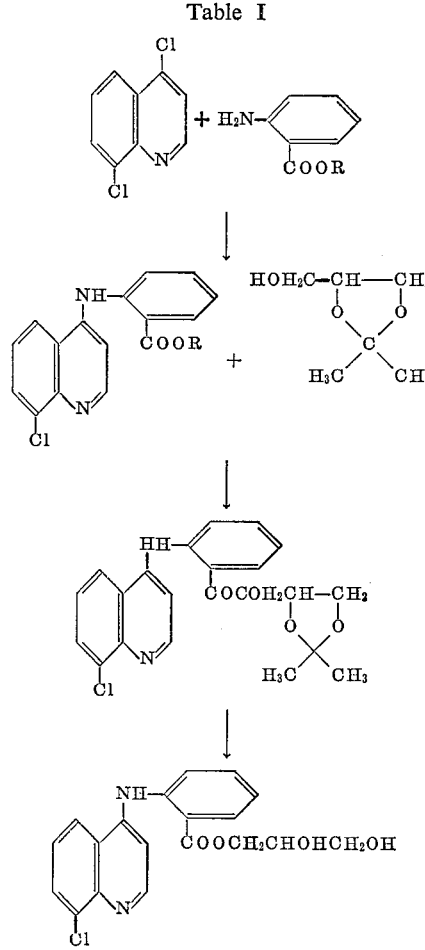

wherein R is a lower alkyl of 1 to 7 carbon atoms.

The novel analgesic and anti-inflammatory compositions of the invention are comprised of a compound selected from the group consisting of the α-monoglyceride of 4-(2'-carboxyphenylamino)-8-chloro-quinoline and its non-toxic pharmacologically acceptable acid addition salts and a major amount of a pharmacological carrier. The compositions can be used for the treatment of inflammatory conditions with or without pain, muscular, articular or nervous pains, rheumatic disturbances, toothaches, zona, migraines, and febrile and infectious states.

The compositions may be in the form of injectable solutions, of injectable suspensions, prepared in ampules, in multiple-dose flacons, in tablets, sugar-coated tablets, syrups, suppositories and ointments and pomades.

The novel method of relieving pain and inflammatory manifestations in mammals comprises administering an effective amount of a compound selected from the group consisting of the α-monoglyceride of 4-(2'-carboxyphenylamino)-8-chloro-quinoline and its non-toxic, pharmacologically acceptable acid addition salts. The usual dosage is 0.100 to 0.400 gm. per individual dose and 0.600 to 1.500 gm. per day in the adult weighing about 150 pounds depending upon the method of administration. The said quinolines may be administered orally, transcutaneously, topically on the skin and mucous membranes or rectally.

In the following example there are described several preferred embodiments to illustrate the invention. However, it should be understood that the invention is not intended to be limited to the specific embodiments.

EXAMPLE

Preparation of the α-monoglyceride of 4-(2'-carboxyphenylamino)-8-chloro-quinoline Step A.—Preparation of 4-(2'-carbomethoxyphenylamino)-8-chloro-quinoline 15 gm. of 4,8-dichloro-quinoline, prepared according to D. S. Tarbell, J. Am. Soc., 68, 1277 (1946), were introduced into 75 cc. of 2 N hydrochloric acid and after 11.5 gm. of methyl anthranilate were added thereto, the mixture was heated for 3 hours at reflux and agitation. Then, the reaction mixture was cooled in an ice bath for 1 hour, vacuum filtered, and the residue was washed with water to obtain the hydrochloride of 4-(2'-carbomethoxyphenylamino)-8-chloro-quinoline.

To obtain the free base, the said hydrochloride was dissolved in 200 cc. of ethanol and 50 cc. of concentrated ammonia were added thereto. The solution was then cooled in an ice bath. The precipitate formed was vacuum filtered, washed with ether, dried and recrystallized from ethanol to obtain 13 gm. of 4-(2'-carbomethoxyphenylamino)-8-chloro-quinoline having a melting point of 183 to 184° C.

Step B.—Preparation of the acetonide of the α-monoglyceride of 4-(2'-carboxy-phenylamino)-8-chloro quinoline 43 cc. of glycerol acetonide were added to 30 cc. of anhydrous toluene and the solution was heated to a temperature of 120 to 125° C. under an atmosphere of nitrogen. The water-toluene azeotrope was distilled off, then the toluene was removed by distillation under vacuum. After cooling the solution to a temperature of 70° C., 130 mg. of sodium amide were introduced therein and the solution was heated for 1½ hours at about 90° C. Next, the temperature was lowered to 60° C. and 10.4 gm. of 4-(2'-carbomethoxyphenylamino)-8-chloro-quinoline were introduced into the solution which was heated under vacuum for 5 hours at about 80° C. Then, the solution was cooled and poured into a water-methylene chloride mixture (10:1) and agitated and decanted. The aqueous phase was extracted with methylene chloride and the extract was washed with water, dried and distilled to dryness.

The residue obtained was triturated with petroleum ether, filtered, vacuum filtered and dried to obtain 12.5 gm. of the acetonide of the α-monoglyceride of 4-(2'-carboxyphenylamino)-8-chloro-quinoline, which, after recrystallization from ethanol, had a melting point of 115° C.

The product obtained was insoluble in water and ether, soluble in acetone, benezene, chloroform and at a high temperature also in ethanol and isopropyl ether.

Analysis.—$C_{22}H_{21}O_4N_2Cl$; molecular weight—412.86. Calculated: C, 63.99%; H, 5.13%; N, 6.78%; Cl, 8.59%. Found: C, 64.1%; H, 5.1%; N, 7.1%; Cl, 8.6%.

This compound is not described in the literature.

Step C.—Preparation of the α-monoglyceride of 4-(2'-carboxyphenylamino)-8-chloro-quinoline The acetonide obtained in Step B was taken up in hot water and the solution was admixed with hydrochloric acid and heated for 15 minutes at 95° C. The residue was iced, vacuum filtered and washed with water to obtain a crystallized product which is the hydrochloride of the α-monoglyceride of 4-(2'-carboxyphenylamino)-8-chloro-quinoline.

To obtain the free base, the hydrochloride was redissolved in dimethylformamide heated to 60° C. After filtration, water and a few cc. of triethylamine were added and the mixture was iced for 1 hour and vacuum filtered. The precipitate was washed with water, dried under vacuum to obtain 13 gm. of α-monoglyceride of 4-(2'-carboxyphenylamino)-8-chloroquinoline, which when recrystallized from tetrahydrofuran had a melting point of 184 to 185° C.

The product occurred in the form of needles which were insoluble in water, ether and benezene and very slightly soluble in acetone and ethanol.

Analysis.—$C_{19}H_{17}ClN_2O_4$; molecular weight=372.8. Calculated: C, 61.21%; H, 4.59%; Cl, 9.51%; N, 7.52%. Found: C, 61.1%; H, 4.7%; Cl, 9.2%; N, 7.8%.

This compound is not described in the literature.

PHARMACOLOGICAL STUDY

Analgesic activity

The test employed was based on the fact noted by Koster et al. (Fed. Proc., 1959, 18, 412) according to which the intraperitoneal injection of acetic acid provoked repeated characteristic movements of stretching and twisting persisting in mice for more than six hours. Analgesics prevent or suppress this syndrome which is an exterior manifestation of a diffuse abdominal pain.

A solution of 6 parts per thousand of acetic acid in water containing 10% of arabic gum was employed and the dose releasing the syndrome in mice under these conditions was 0.01 cc./gm., being 60 mg./kg. of acetic acid. The analgesics were administered orally to groups of five mice, which had not been fed for 24 hours, a half hour before the intraperitoneal injection of the acetic acid. The stretchings were observed, noted and counted for each mouse and then additionally by groups of five, during a period of observation of fifteen minutes immediately after the injection of acetic acid. The average number of stretchings observed on the control groups of five mice during the period of observation indicated, was established at 454 per group.

The product of the invention which was administered in the form of an aqueous suspension diminished the number of stretchings in a fashion obviously proportional to the doses utilized, as is shown in Table II.

TABLE II

| Test compound | Doses utilized in mg./kg. | Number of stretchings per group of 5 mice | Percent of stretchings by reference to the average of the controls | Percent of protection |
|---|---|---|---|---|
| Controls | 0 | 454 | | |
| The α-monoglyceride of 4-(2'-carboxyphenylamino)-8-chloro-quinoline. | 10 | 362 | 79.6 | 20.4 |
| | 20 | 341 | 75.2 | 24.8 |
| | 50 | 162 | 35.7 | 64.3 |
| | 100 | 145 | 32.0 | 68.0 |
| | 200 | 106 | 23.3 | 76.7 |

The dose necessary to reduce stretchings by one-half is 35 mg./kg.

Table II shows that the α-monoglyceride of 4-(2'-carboxyphenylamino)-8-chloro-quinoline is more than 4.7 times more active than aspirin whose $ED_{50}$ under the same test conditions was 165 mg./kg.

Anti-inflammatory activity (A) Test of the edematized paw in the rat.—The test consisted in administering to rats weighing from 160 to 170 gm. in a single injection 500γ of naphthoylheparamine in the aponeurotic pad of a posterior paw in order to provoke the formation of an inflammatory edema. The product to be studied was administered orally one hour before the injection. The maximum circumference of the two posterior paws was measured two hours and three hours after the injection and the difference between the circumferences of the two posterior paws of each animal (paw having received the injection of naphthoylheparamine and the intact paw) served to evaluate the extent of the inflammation. The measure of the inflammation in the treated rats was expressed in percentage with reference to those of the control animals. The results are summarized in Table III.

TABLE III 20 mg./kg.:
- 2 hours after _____ 18
- 3 hours after _____ 0

100 mg./kg.:
- 2 hours after _____ 57
- 3 hours after _____ 18

The 40% active dose ($AD_{40}$) is, therefore, about 100 mg./kg.

Acute toxicity on mice by oral administration

The α-monoglyceride of 4-(2'-carboxyphenylamino)-8-chloro-quinoline was utilized in aqueous suspension and was administered orally at increasing doses to groups of mice. The animals were held under observation for a period of two weeks and the phenomena of intoxication or the mortality was noted. The lethal dose ($LD_{50}$) was more than 4 gm./kg. in the mice.

We claim:
1. A compound selected from the group consisting of the α-monoglyceride of 4-(2'-carboxyphenylamino)-8-chloro-quinoline and its non-toxic, pharmaceutically acceptable acid addition salts.
2. A compound of claim 1 which is the α-monoglyceride of 4-(2'-carboxyphenylamino)-8-chloro-quinoline.
3. A compound of claim 1 which is the hydrochloride of the α-monoglyceride of 4-(2'-carboxyphenylamino)-8-chloro-quinoline.

References Cited

UNITED STATES PATENTS

| | | | |
|---|---|---|---|
| 2,769,808 | 11/1956 | Tenenbaum | 260—340.9 X |
| 3,174,972 | 3/1965 | Allais et al. | 260—287 |
| 3,232,944 | 2/1966 | Allais et al. | 260—287 X |
| 3,285,880 | 11/1966 | Miller et al. | 260—340.9 |

ALEX MAZEL, *Primary Examiner.*

D. G. DAVIS, *Assistant Examiner.*

U.S. Cl. X.R.

260—340.9, 286; 424—258

PO-1050
(5/69)

UNITED STATES PATENT OFFICE
CERTIFICATE OF CORRECTION

Patent No. 3445469                                Dated  May 20, 1969

Inventor(s)   ANDRÉ ALLAIS and PIERRE GIRAULT

It is certified that error appears in the above-identified patent and that said Letters Patent are hereby corrected as shown below:

Column 1, after line 10, insert:

--Claims priority, applications France, April 2, 1965, No. PV 11769 and July 2, 1965, No. PV 23309. --

SIGNED AND
SEALED
JAN 20 1970

(SEAL)
Attest:

Edward M. Fletcher, Jr.
Attesting Officer

WILLIAM E. SCHUYLER, JR.
Commissioner of Patents